(12) United States Patent
Nakayama

(10) Patent No.: US 11,380,309 B2
(45) Date of Patent: Jul. 5, 2022

(54) MEETING SUPPORT SYSTEM, MEETING SUPPORT DEVICE, AND MEETING SUPPORT PROGRAM

(71) Applicant: KONICA MINOLTA, INC., Tokyo (JP)

(72) Inventor: Yoshimi Nakayama, Hino (JP)

(73) Assignee: KONICA MINOLTA INC., Tokyo (JP)

( * ) Notice: Subject to any disclaimer, the term of this patent is extended or adjusted under 35 U.S.C. 154(b) by 152 days.

(21) Appl. No.: 16/998,076

(22) Filed: Aug. 20, 2020

(65) Prior Publication Data

US 2021/0082409 A1 Mar. 18, 2021

(30) Foreign Application Priority Data

Sep. 13, 2019 (JP) .............................. JP2019-166815

(51) Int. Cl.
  *G10L 15/00* (2013.01)
  *G10L 15/18* (2013.01)
  *G10L 15/02* (2006.01)
  *G10L 15/22* (2006.01)
  *G10L 15/183* (2013.01)

(52) U.S. Cl.
  CPC .......... *G10L 15/1815* (2013.01); *G10L 15/02* (2013.01); *G10L 15/22* (2013.01); *G10L 15/183* (2013.01); *G10L 15/1822* (2013.01)

(58) Field of Classification Search
  CPC combination set(s) only.
  See application file for complete search history.

(56) References Cited

FOREIGN PATENT DOCUMENTS

| JP | 2011066794 A | 3/2011 |
| JP | 2017091535 A | 5/2017 |
| JP | 2018169651 A | 11/2018 |

*Primary Examiner* — Vu B Hang
(74) *Attorney, Agent, or Firm* — Buchanan Ingersoll & Rooney PC

(57) ABSTRACT

There is provided a meeting support system that supports the progress of a meeting, the meeting support system including a hardware processor that: determines a first feature value based on information about a meeting, the first feature value corresponding to a range of a subject of a meeting, the information about a meeting having been registered in advance; stores a weight, the weight corresponding to each type of meeting; extracts a word or phrase from speech of participants in a meeting; determines a second feature value corresponding to the extracted word or phrase; and determines whether a speech is off topic from a subject of a meeting, depending on whether the second feature value is included in an allowable range, the allowable range being specified by the first feature value and the weight corresponding to a type of an ongoing meeting.

22 Claims, 7 Drawing Sheets

| TYPE OF MEETING | WEIGHT [W] |
|---|---|
| (1) BRIEFING | 1.3 |
| (2) PROBLEM RESOLUTION | 2.0 |
| (3) BRAINSTORMING | 5.0 |
| (4) DECISION MAKING | 4.0 |

| ELAPSED TIME | WEIGHT [W2] |
|---|---|
| n = 1:   0 TO 10 MINUTES | 1.0 |
| 2:  10 TO 20 MINUTES | 2.0 |
| 3:  20 TO 30 MINUTES | 1.5 |
| 4:  30 TO 40 MINUTES | 1.2 |

MEETING SUPPORT SYSTEM, MEETING SUPPORT DEVICE, AND MEETING SUPPORT PROGRAM

The entire disclosure of Japanese patent Application No. 2019-166815, filed on Sep. 13, 2019, is incorporated herein by reference in its entirety.

BACKGROUND

Technological Field

The present invention relates to a meeting support system, a meeting support device, and a meeting support program.

Description of the Related Art

In meeting, speech that is off topic from a predetermined subject hinders the progress of the meeting. Therefore, as a technology for smoothly supporting the progress of the meeting, there are technologies disclosed in, for example, JP 2011-66794 A, JP 2017-91535 A, and JP 2018-169651 A. JP 2011-66794 A describes the extraction, categorization, and counting of words matching or similar to any of predetermined affirmative or negative keywords or key phrases, determining whether a meeting progresses smoothly on the basis of a result of the extraction, categorization, and counting.

Furthermore, J P 2017-91535 A describes a meeting intelligence system that performs syntactic analysis of meeting content data to indicate an appropriate agenda topic, performs sentiment analysis to detect ongoing discussion that is to be interrupted, and generates a scheduling instruction.

Furthermore, J P 2018-169651 A describes referencing to an evaluation table registered for each meeting category, calculating a result per meeting elapsed time from the number of speakers and the speech time after the meeting starts, and evaluating the saturation of the meeting to issue an alert.

However, the technology described in JP 2011-66794 A cannot prevent a meeting from being off topic from a predetermined subject, even if the meeting has a content that is off topic from the subject, when the meeting progresses with approval from all speakers. Furthermore, the technology disclosed in JP 2017-91535 A may have a possibility that the progress of a meeting may be hindered due to a variety of topics, such as in a brainstorming meeting. Furthermore, the technology described in JP 2018-169651 A does not consider what is actually spoken in a meeting, and therefore, the progress of the meeting that is off topic from a subject cannot be prevented.

SUMMARY

Therefore, an object of the present invention is to provide a meeting support system, a meeting support device, and a meeting support program that sufficiently prevent a meeting from being off topic from a predetermined subject.

To achieve the abovementioned object, according to an aspect of the present invention, there is provided a meeting support system that supports the progress of a meeting, and the meeting support system reflecting one aspect of the present invention comprises: a hardware processor that: determines a first feature value based on information about a meeting, the first feature value corresponding to a range of a subject of a meeting, the information about a meeting having been registered in advance; stores a weight, the weight corresponding to each type of meeting; extracts a word or phrase from speech of participants in a meeting; determines a second feature value corresponding to the extracted word or phrase; and determines whether a speech is off topic from a subject of a meeting, depending on whether the second feature value is included in an allowable range, the allowable range being specified by the first feature value and the weight corresponding to a type of an ongoing meeting.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of a meeting support system, a meeting support device, and a meeting support program according to the present invention will be described in detail with reference to the drawings. However, the scope of the invention is not limited to the disclosed embodiments.

<<Meeting Support System>>

Figure 1:
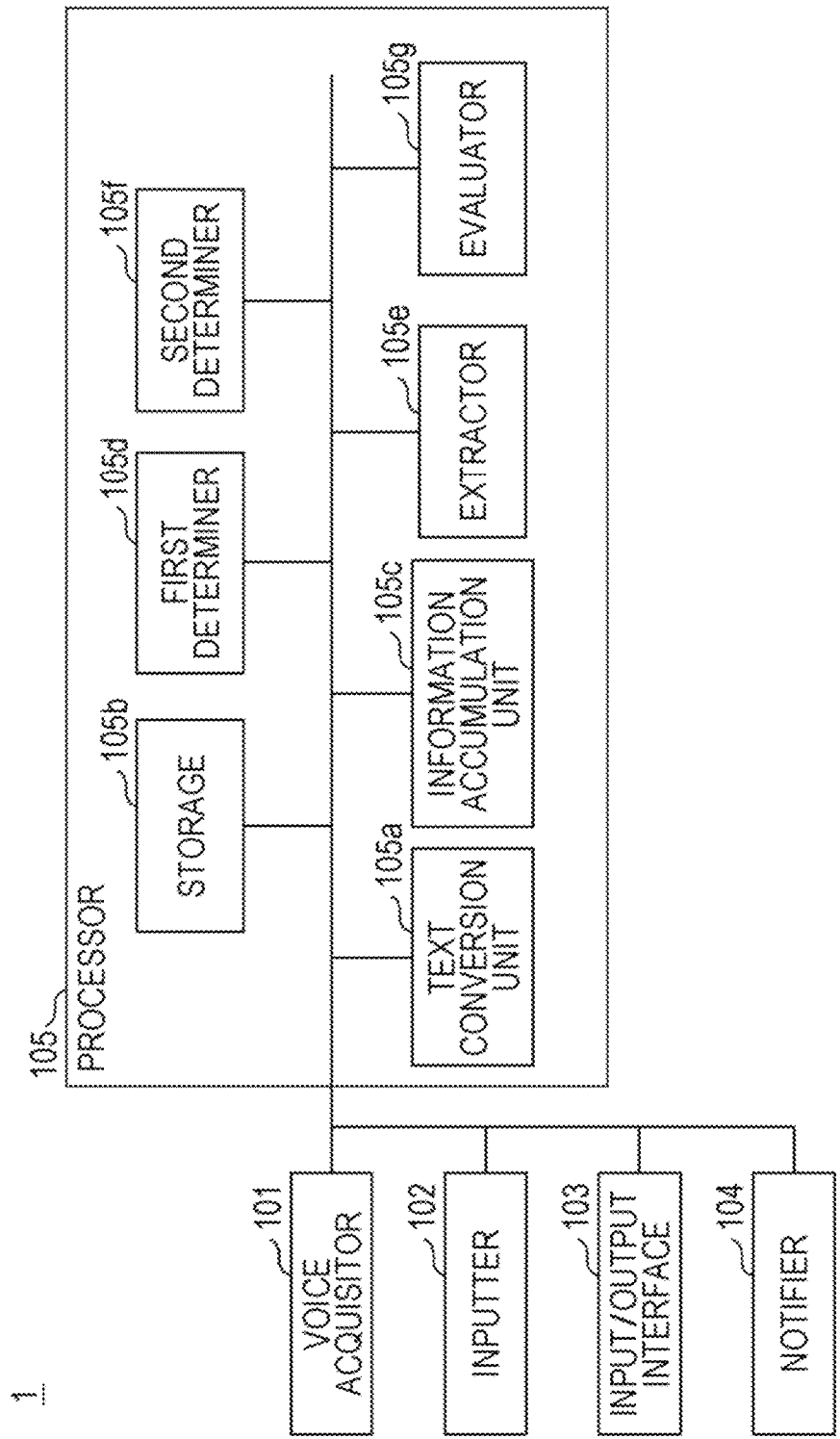
FIG. 1 is a block diagram illustrating a configuration of a meeting support system according to an embodiment of the present invention.

FIG. 1 is a block diagram illustrating a configuration of a meeting support system 1 according to an embodiment.

Figures 2, 3:
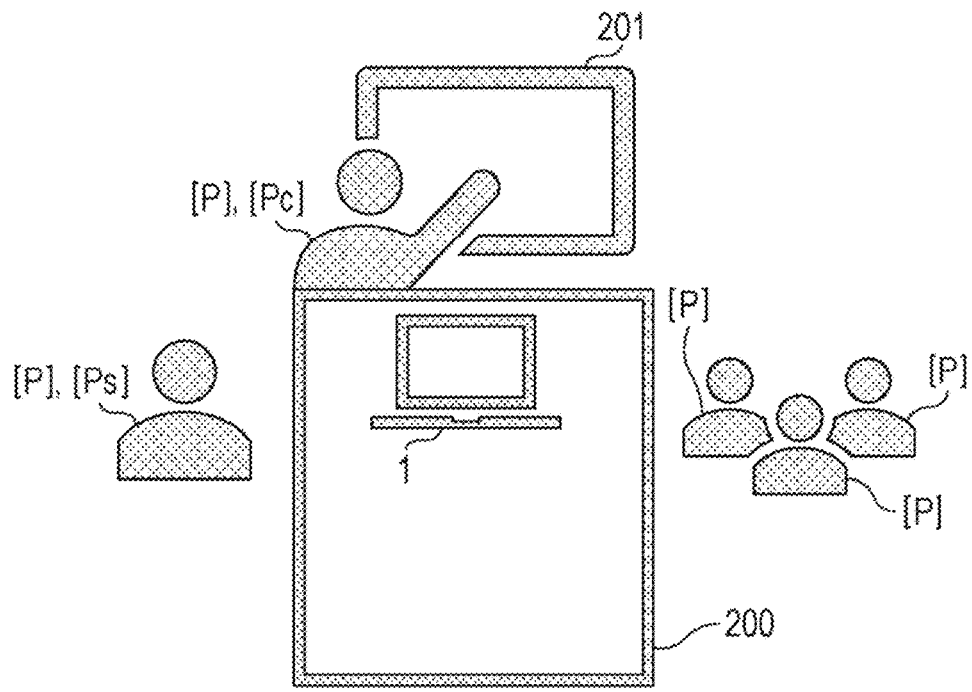
FIG. 2 is a diagram illustrating an example of a meeting using a meeting support system according to an embodiment of the present invention.
FIG. 3 is a diagram illustrating an example of setting weights in a meeting support system according to an embodiment of the present invention.

Furthermore, FIG. 2 is a diagram illustrating an example of a meeting using a meeting support system according to an embodiment of the present invention, showing a meeting in which a plurality of (five) participants [P] including a chairman [Pc] surround a table 200. In such a meeting, as an example, the meeting is held using the meeting support system 1 together with a whiteboard 201. The meeting support system 1 used here is a system that supports the progress of the meeting by natural language processing using, for example, text mining or by voice processing.

As illustrated in FIG. 1, the meeting support system 1 includes a voice acquisitor 101, an inputter 102, an input/output interface 103, a notifier 104, and a processor 105 connected to each of these component elements. The voice acquisitor 101, the inputter 102, the input/output interface 103, and the notifier 104 may be connected to the processor 105 via wiring but may be connected by wireless communication. Details of these component elements will be described below.

<Voice Acquisitor 101>

The voice acquisitor 101 is a microphone that acquires speech during a meeting as voice and is connected to the processor 105. One voice acquisitor 101 may be employed but a necessary number of voice acquisitors 101 may be provided. The necessary number represents, for example, the number of people who participate in the meeting or the number of people appropriate for the size of a place where the meeting is held. Furthermore, when this meeting support system 1 is applied to a telephone meeting in which a plurality of places is connected via a network, the voice acquisitor 101 is arranged at each place.

<Inputter 102>

The inputter 102 is a device that inputs settings for meeting support and is connected to the processor 105. Such an inputter 102 may include, for example, a keyboard or a touch panel that is provided integrally with a display device. In addition, the inputter 102 may be used as a device that inputs speech during a meeting as text data. In this case, the inputter 102 may be provided as many as needed, as in the voice acquisitor 101.

<Input/Output Interface 103>

The input/output interface 103 is a section that sends and receives a preliminary document or the like for a meeting and is, for example, a network interface for connection with an external terminal device or is a connection port.

<Notifier 104>

The notifier 104 is a device that provides notification of the progress of a meeting determined by the processor 105, which is described next, and is connected to the processor 105. Such a notifier 104 may be, for example, a display device or a speaker. Furthermore, the notifier 104 may be provided as many as needed, as in the voice acquisitor 101.

<Processor 105>

The processor 105 is a section that determines the progress of a meeting on the basis of information from the voice acquisitor 101 and the inputter 102 and supports the progress of the meeting and includes a calculator. The calculator is hardware used as a so-called computer. The calculator includes a central processing unit (CPU) a read only memory (ROM), random access memory (RAM), and a storage such as hard disk drive (HDD). Furthermore, it is assumed that the processor 105 includes a real time clock (RTC), which is not illustrated here.

A procedure for supporting the progress of a meeting by such a processor 105 will be described in detail in a meeting support method described below. A procedure of the meeting support method executed in the processor 105 employs a program as the meeting support program, and the program is stored in the ROM or loaded and stored in the RAM or another storage from an external device. Furthermore, such a processor 105 does not need to be provided in a place where a meeting is held but may be provided in a server on a network.

The processor 105 configured as described above includes, as functional elements, a text conversion unit 105a, a storage 105b, an information accumulation unit 105c, a first determiner 105d, an extractor 105e, a second determiner 105f, and an evaluator 105g. Each of these functional elements is configured as follows.

[Text Conversion Unit 105a]

The text conversion unit 105a is a section that converts voice information acquired by the voice acquisitor 101 or voice information input from the input/output interface 103 into text information. Note that the text conversion unit 105a is preferably provided as necessary. For example, in a case where voice information acquired by the voice acquisitor 101 is vectorized into vector information and processing is performed using the vector information, it is not essential to provide the text conversion unit 105a.

[Storage 105b]

The storage 105b is a section that holds setting conditions necessary for analysis processing performed by the first determiner 105d, second determiner 105f, and evaluator 105g, which are described below. One of the setting conditions held in the storage 105b is a weight [W] that is used to calculate an allowable range for determining whether discussion is held on a subject during a meeting.

Here, the allowable range represents a range in which a discussion during a meeting may be off topic from a subject, reaching no conclusion, and the range is specified by the weight [W]. Such a weight [W] is a variable that changes a value within an allowable range and is a setting condition that is set for each type of meeting.

FIG. 3 is a diagram illustrating an example of the weights [W] in the meeting support system according to an embodiment of the present invention. As illustrated in this figure, a larger value is given as a weight [W] to a meeting for "(2) problem resolution" meeting or a meeting for "(3) brainstorming", compared with a meeting that proceeds according to materials, such as a meeting for "(1) briefing", and thereby the allowable range for a meeting in which a discussion reaches no conclusion is set wider.

In addition, a weight [W2] may be set per elapsed time of the meeting. In this case, the meeting is divided into a plurality of time slots along the elapsed time, and a weight [W2] is set for each of the time slots after dividing. The weight [W2] set for each time slot is set to gradually decrease as an end time of the meeting or time limit given to a subject [Tm] of the meeting approaches and to conclude the meeting. Note that the respective time slots may not necessarily have a constant length.

In addition, the weight may be set for a participant [P]. In this case, for example, from among the participants [P] of the meeting, a large value is given as the weight to the chairman [Pc] of the meeting or a specific participant [Ps] who frequently speaks on the subject [Tm], and the allowable range for a meeting in which a discussion reaches no conclusion is set wider. Such a specific participant [Ps] may be specified by an input from the inputter 102 or may be extracted on the basis of speech in a meeting held in the past.

Note that in a case where the weight is set for a participant [P], it is assumed that the processor 105 includes a speaker identification unit that identifies voice information acquired by the voice acquisitor 101 for each speaker.

Returning to FIGS. 1 and 2, as another one of the setting conditions held by the storage 105b, for example, a specific participant who is excluded upon determination of the progress of the meeting may be set from the participants [P] of the meeting. The specific participant is, for example, the chairman [Pc] of the meeting or a specific participant [Ps] who frequently speaks on the subject [Tm]. Such a specific participant [Ps] may be specified by an input from the inputter 102 or may be extracted on the basis of speech in a meeting held in the past.

Even in the case of setting the specific participant who is excluded upon determination of the progress of the meeting in this way, the processor 105 includes the speaker identification unit that identifies voice information acquired by the voice acquisitor 101 for each speaker.

[Information Accumulation Unit 105c]

The information accumulation unit 105c stores meeting information. The meeting information stored in the information accumulation unit 105c is advance information on a meeting and speech information during an ongoing meeting, all of which are text information, voice information, and information obtained by analyzing such information. The text information includes information converted to text by the text conversion unit 105a and information input from the inputter 102.

The advance information on a meeting is information about a meeting that has been registered in advance, is a reference material that describes a meeting guide and background information about a meeting, and includes information about a meeting having been held in the past. Furthermore, the advance information on a meeting includes minutes of a meeting having been held in the past, notes taken during a meeting, speech information during a meeting, and the like. The speech information during a meeting having been held in the past may be text information or may be vector information obtained by vectorization of voice information. It is assumed that such advance information as described above is stored in association with each subject [Tm].

Furthermore, the speech information during an ongoing meeting includes information obtained by converting voice information acquired by the voice acquisitor 101 during a meeting into text in the text conversion unit 105a, text information input from the inputter 102, and information obtained by analyzing such text information. Furthermore, the speech information during an ongoing meeting may include vector information of voice information acquired by the voice acquisitor 101 during a meeting and information obtained by analyzing the vector information. Such speech information during an ongoing meeting is processed as information for supporting the meeting, during the meeting and then added, as the advance information on a meeting, to the information accumulation unit 105c.

[First Determiner 105d]

The first determiner 105d determines a first feature value corresponding to a range of a subject in a meeting described above, on the basis of information about a meeting (advance information on a meeting) that has been registered in advance. The first feature value and a procedure for determining the first feature value that is performed in the first determiner 105d will be described in detail in the meeting support method which is described later.

[Extractor 105e]

The extractor 105e extracts a word or phrase from the speech of the participants in an ongoing meeting. A word or phrase extracted by the extractor 105e may be typically a word but may be a word or phrase in which words are connected, a compound word including a particle, a derivative having a prefix or suffix or having word inflection.

[Second determiner 105f]

The second determiner 105f determines a second feature value corresponding to a word or phrase extracted by the extractor 105e. The second feature value and a procedure for determining the second feature value that is performed in the second determiner 105f will be described in detail in the meeting support method which is described later.

[Evaluator 105g]

The evaluator 105g determines the progress of a meeting on the basis of a first feature value determined by the first determiner 105d, a second feature value determined by the second determiner 105f, and information stored in the storage 105b. A procedure for determining the progress of the meeting that is performed in the evaluator 105g will be described in detail in the meeting support method which is described later.

Note that each component element of the meeting support system 1 described above may be incorporated in, for example, one device to form the meeting support device. Such a meeting support device may be a personal computer that holds the meeting support program, which is described later, as application software.

<<Meeting Support Method>>

Next, the meeting support method performed by the meeting support system 1 having a configuration as described above will be described. The meeting support method described here is achieved by executing the meeting support program by the processor 105 of the meeting support system 1, which has been described with reference to FIGS. 1 and 3. Note that in the following, a description is made that it is assumed that the advance information on a meeting and the speech information during an ongoing meeting include text information and information based on the text information, but the advance information on a meeting and the speech information during a meeting may include vector information or the text information and the vector information.

<Preprocessing>

Figure 4:
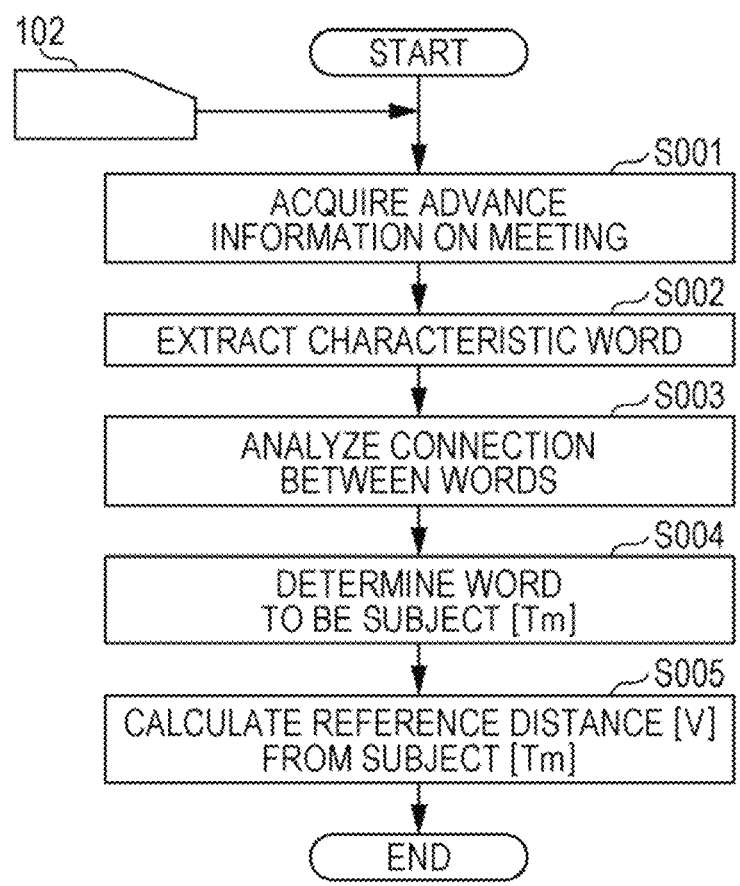
FIG. 4 is a flowchart illustrating a procedure of preprocessing for meeting support, the preprocessing being executed by a meeting support program according to an embodiment of the present invention.

FIG. 4 is a flowchart illustrating a procedure of preprocessing for meeting support, the preprocessing being executed by the meeting support program according to an embodiment of the present invention. Hereinafter, according to the flowchart of FIG. 4, referring to FIGS. 1 to 3 and, if necessary, another figure, the preprocessing in the meeting support method executed by the meeting support program according to an embodiment will be described.

In this preprocessing, a chairman [Pc] or an organizer of a next meeting to be supported operates, for example, the inputter 102 to make an input for an instruction to perform the preprocessing about the corresponding meeting, and thereby the preprocessing is started as follows.

[Step S001]

In step S001, the first determiner 105d acquires advance information on a meeting. At this time, the first determiner 105d acquires text information about the next meeting to be supported, from among advance information on meetings accumulated in the information accumulation unit 105c, on the basis of input information from the inputter 102.

[Step S002]

In step S002, the first determiner 105d extracts a characteristic word or phrase (e.g., a word) for the corresponding meeting from among the advance information on the meeting acquired in step S001. In this case, the first determiner 105*d* performs a morphological analysis of the acquired text information and extracts a characteristic word on the basis of appearance frequency.

[Step S003]

In step S003, the first determiner 105*d* performs syntactic analysis of the text information about the next meeting to be supported, acquired in step S001 to analyze connection between words extracted by the morphological analysis in step S002. At this time, the first determiner 105*d* creates, as an example, a network (first co-occurrence network) in which an extracted word is expressed as a vertex (node) and related words are connected by a line (edge).

Figure 5:
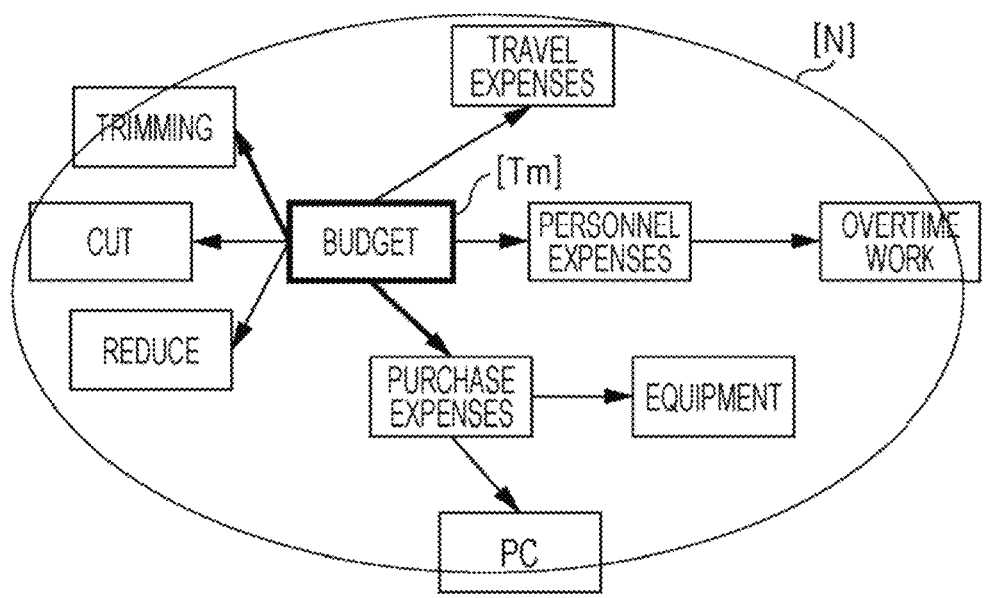
FIG. 5 is a network diagram (No. 1) illustrating an example of preprocessing for meeting support, the preprocessing being performed by a meeting support system according to an embodiment of the present invention.
Figure 6:
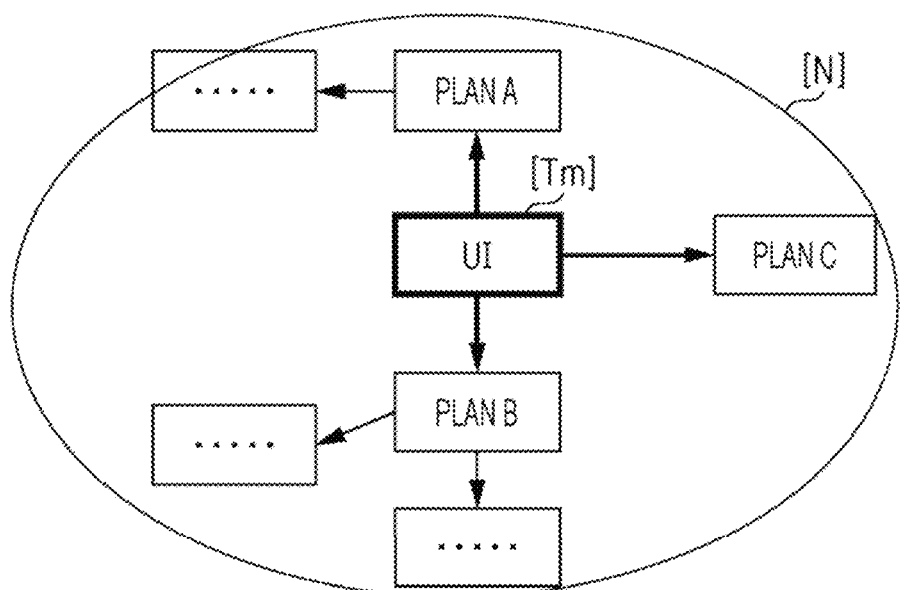
FIG. 6 is a network diagram (No. 2) illustrating an example of preprocessing for meeting support, the preprocessing being performed by a meeting support system according to an embodiment of the present invention.

FIG. 5 is a network diagram (No. 1) illustrating an example of preprocessing for meeting support, the preprocessing being performed by the meeting support system according to an embodiment of the present invention, and the diagram illustrates an example of a network [N] created by analyzing text information when the next meeting to be supported is the meeting for "(2) problem resolution". Furthermore, FIG. 6 is a network diagram (No. 2) illustrating an example of preprocessing for meeting support, the preprocessing being performed by the meeting support system according to an embodiment of the present invention, and the diagram illustrates an example of a network [N] created by analyzing text information when the next meeting to be supported is the meeting for "(3) brainstorming".

As illustrated, in each of the networks, the frequency of connection between words is indicated by the thickness of a line (edge) connecting the words. Furthermore, the first determiner 105*d* vectorizes words extracted from the text information and arranges related words in proximity to each other on the network.

[Step S004]

In step S004, the first determiner 105*d* determines a word to be a subject [Tm] of the meeting, on the basis of the network created in step S003. In this case, the first determiner 105*d* finds, for example, a word at the center of the network. This word at the center is determined by a method of finding closeness centrality in network analysis. In this method, a word having the smallest average distance from each word is selected as the word at the center. Therefore, a word directly connected to various words or word having a high appearance frequency is selected as the word at the center, that is, the word to be a subject [Tm]. Accordingly, sometimes, a plurality of words is selected as the word to be a subject [Tm].

Note that as the word to be a subject [Tm], the agenda of a meeting may be selected. As an example, the example of FIG. 5 illustrates that the word "budget" is determined as the subject [Tm], and the example of FIG. 6 illustrates that the word "user Interface (UI)" is determined as the subject [Tm].

For the word to be a subject [Tm], a word (node) having a predetermined number of edges in the network created in step S003 may be used as the subject [Tm]. In this case, the number of edges has a value set by input from the inputter 102, and when the number of selected subjects [Tm] is large, processing of changing the number of edges may be added.

Furthermore, the first determiner 105*d* may be set to select, as a topic, a word having low closeness centrality from among words directly connected to the word selected as the subject [Tm]. At this time, the first determiner 105*d* extracts a topic from words highly relevant to the subject.

[Step S005]

In step S005, the first determiner 105*d* calculates, as a feature value, a distance from a subject [Tm], for each subject [Tm] selected in step S004. Here, an average value of distances from a subject [Tm] to the respective words is obtained for each subject [Tm], and this average value is set as a reference distance [V] from the subject [Tm]. The first determiner 105*d* determines the obtained reference distance [V] as the first feature value. At this time, the distance and the average value are calculated as vector quantities and have directionality.

Furthermore, a distance from the subject [Tm] to each word represents a value including a relevance between words. Here, the relevance between words represents, for example, a value based on the number of connections between words (co-occurrence frequency). The distance between words may be simply calculated in proportion to the number of connections between words but is not limited to this. A distance between words may be calculated to have an exponentially long distance to the number of connections. Furthermore, a distance between words having a small number of connections may be made smaller so that the words are positioned closer to each other.

In addition, in step S004, when a topic is also determined together with the subject [Tm] of the meeting, the first determiner 105*d* similarly calculates a reference distance for the topic and determines the calculated reference distance as the first feature value.

<Processing of Determining Progress of Meeting>

Figure 7:
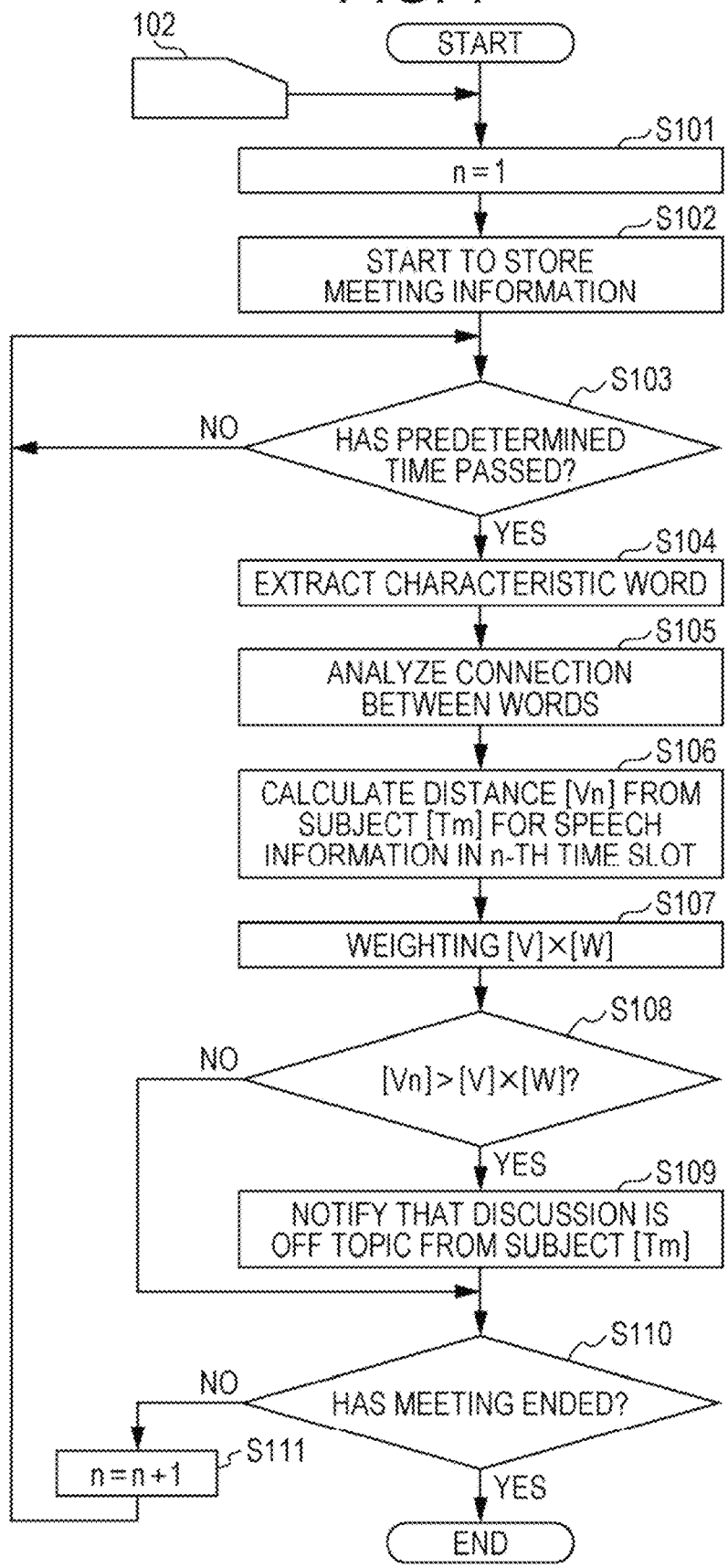
FIG. 7 is a flowchart illustrating a procedure of meeting support performed by a meeting support program according to an embodiment of the present invention.

FIG. 7 is a flowchart illustrating a procedure of meeting support executed by a meeting support program according to an embodiment of the present invention. Hereinafter, according to the flowchart of FIG. 7, the procedure of meeting support that is executed by a meeting support program according to an embodiment will be described with reference to FIGS. 1 to 3, and, if necessary, another figure.

This procedure is started, for example, when the chairman [Pc] of the meeting inputs the setting for the start of the meeting for which the preprocessing described above has been performed, by operating the inputter 102. The setting for the start input here represents the setting of the type of meeting and a subject [Tm] thereof. The subject [Tm] is preset by the first determiner 105*d*, but in order to change the preset subject [Tm], the subject [Tm] is preferably changed by operating the inputter 102. Note that a single or a plurality of subjects [Tm] may be adopted. When the subject [Tm] is changed, the first determiner 105*d* performs step S005 described above again to determine a reference distance [V] (first feature value) for the changed subject [Tm].

In addition to the above, for the setting for the meeting, an input may be made to specify whether to set a weight [W2] to an elapsed time of the meeting, specify whether to set a weight to a participant, and specify whether to exclude a specific participant upon determination.

Furthermore, here, as the setting for the meeting, an input may be made to change a setting condition (see FIG. 3) held in the storage 105*b*, if necessary.

As described above, after the setting for the meeting is input by the operation of the inputter 102, the evaluator 105*g* performs the processing according to the following procedure.

[Step S101]

In step S101, the second determiner 105*f* performs processing to have n=1.

[Step S102]

In step S102, the second determiner 105*f* causes the information accumulation unit 105*c* to start to store speech information in the ongoing meeting. Therefore, the information accumulation unit 105*c* stores text information that is obtained by converting voice information acquired by the voice acquisitor 101 in the text conversion unit 105*a*, as speech information during the meeting obtained in the n-th time slot (starting from n=1) of this meeting. Furthermore, the information accumulation unit 105c may also store text information input from the inputter 102, as the speech information during the meeting obtained in the n-th time slot of this meeting.

[Step S103]

In step S103, the second determiner 105f determines whether a predetermined time has passed. Here, for example, at the end of the elapsed time corresponding to the n-th time slot held in a setting holding unit, it is determined that the predetermined time has passed (YES), and the process proceeds to the next step S104.

[Step S104]

In step S104, the second determiner 105f causes the extractor 105e to extract a characteristic word from the speech information in the meeting accumulated in the information accumulation unit 105c during the n-th time slot of the ongoing meeting. In this case, the extractor 105e performs morphological analysis of text information and extracts a characteristic word on the basis of appearance frequency. Note that, in the setting for the meeting, when a specific participant is specified to be excluded upon determination, the extractor 105e performs processing by excluding text information obtained based on the speech information of the specified specific participant.

[Step S105]

In step S105, the second determiner 105f performs syntactic analysis of the text information accumulated in the information accumulation unit 105c during the n-th time slot to analyze connection between the words extracted by the morphological analysis in step S104. Here, the analysis processing the same as that in step S003 of the preprocessing described above is performed to create, as a network in the n-th time slot, a network (second co-occurrence network) in which, for example, an extracted word is expressed as a vertex (node) and related words are connected by a line (edge).

Figure 8:
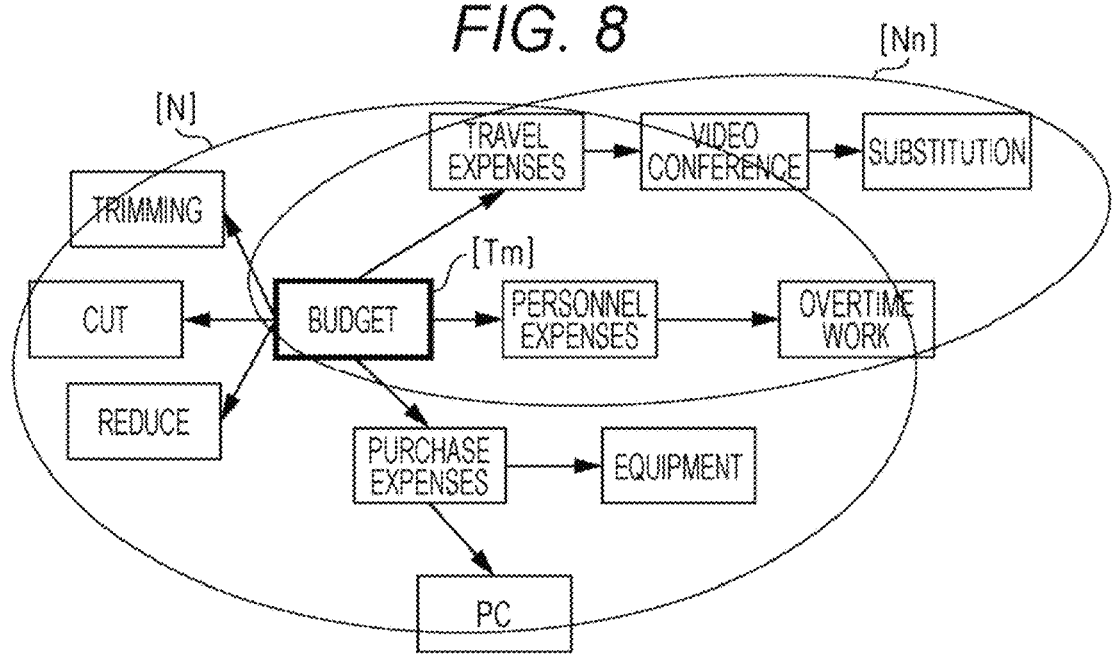
FIG. 8 is a network diagram (No. 1) illustrating an example of meeting support by a meeting support system according to an embodiment of the present invention.
Figure 9:
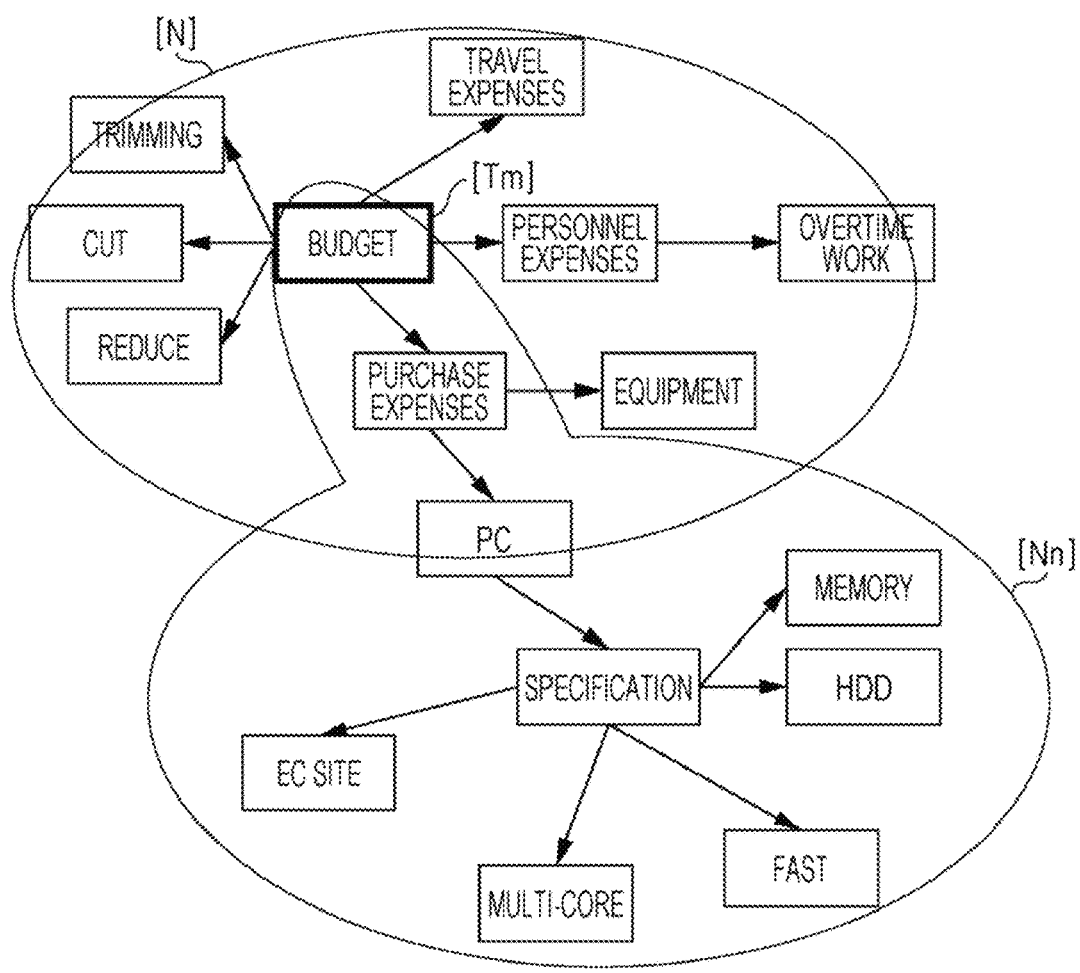
FIG. 9 is a network diagram (No. 2) illustrating an example of meeting support by a meeting support system according to an embodiment of the present invention.

Here, FIG. 8 is a network diagram (No. 1) illustrating an example of meeting support by the meeting support system according to an embodiment of the present invention, and FIG. 9 is a network diagram (No. 2) illustrating an example of meeting support by the meeting support system according to an embodiment of the present invention. FIGS. 8 and 9 illustrate two examples of a network [Nn] created by analyzing the text information in the n-th time slot in a case where this meeting is the meeting for "(2) problem resolution".

Figure 10:
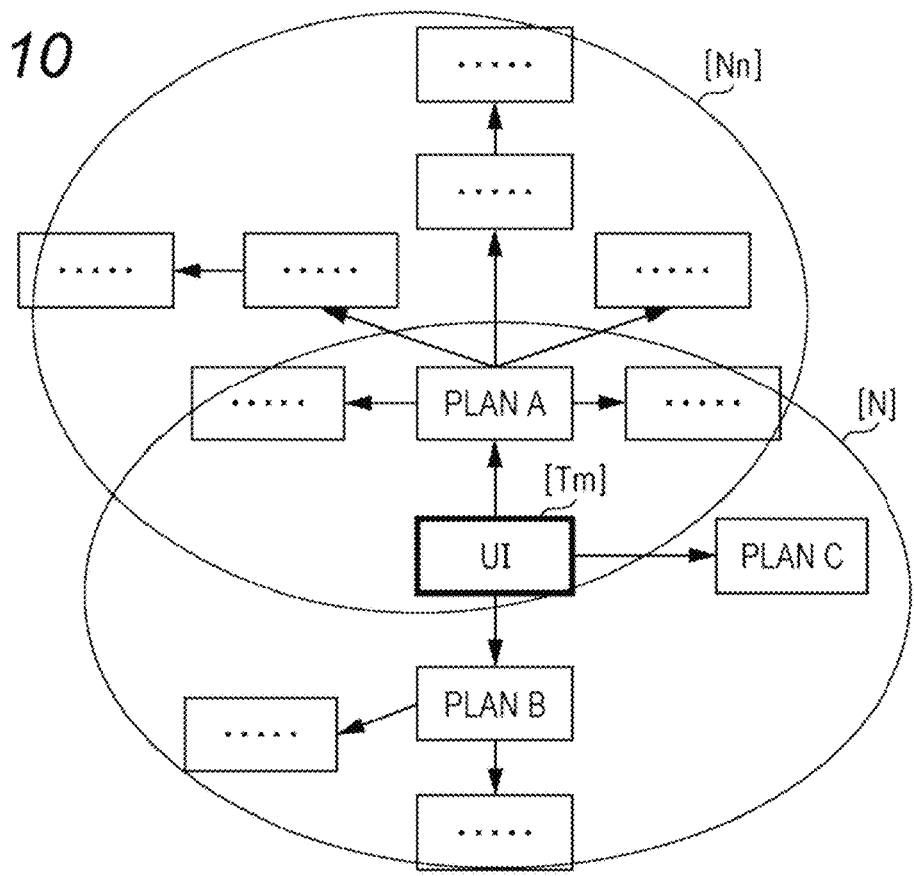
FIG. 10 is a network diagram (No. 3) illustrating an example of meeting support by a meeting support system according to an embodiment of the present invention.
Figure 11:
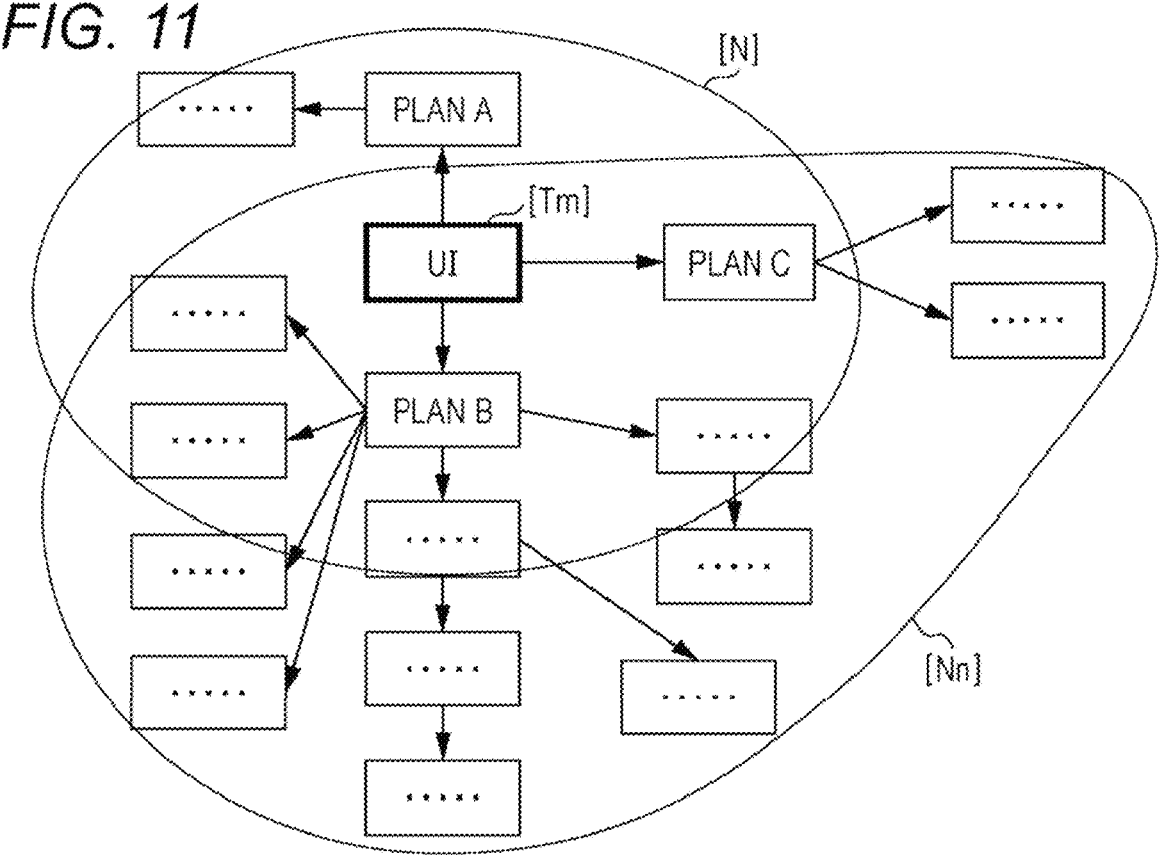
FIG. 11 is a network diagram (No. 4) illustrating an example of meeting support by a meeting support system according to an embodiment of the present invention.

Furthermore, FIG. 10 is a network diagram (No. 3) illustrating an example of meeting support by the meeting support system according to an embodiment of the present invention, and FIG. 11 is a network diagram (No. 4) illustrating an example of meeting support by the meeting support system according to an embodiment of the present invention. FIGS. 10 and 11 illustrate two examples of a network [Nn] created by analyzing the text information in the n-th time slot in a case where this meeting is the meeting for "(3) brainstorming".

As illustrated in these figures, a network [Nn] created on the basis of text information about speech information in an actual meeting is different from a network [N] obtained in the preprocessing. Furthermore, these networks [Nn] will vary depending on elapsed time in meeting.

[Step S106]

In step S106, the second determiner 105f calculates, as a second feature value, a distance [Vn] from a subject [Tm] in the n-th time slot on the basis of a network [Nn] in the n-th time slot created in step S105. The calculation of such a distance [Vn] is performed in the same manner as that in the procedure of step S005 of the preprocessing described above, and an average value of the distances from the subject [Tm] to the respective words is calculated as the distance [Vn] from the subject [Tm].

If a topic is also determined together with the subject [Tm] of the meeting, the distance is calculated for the topic as well. In addition, the second determiner 105f may extract a topic from words highly relevant to the subject [Tm] on the basis of a network [Nn] created in step S105, thereafter calculating the distance for the extracted topic.

When a plurality of subjects [Tm] is selected, the second determiner 105f categorizes a network [Nn] in the n-th time slot into any subject [Tm] on the basis of the network [Nn] in the n-th time slot created in step S105, calculating a distance from the subject [Tm] into which the network [Nn] is categorized.

[Step S107]

In step S107, the evaluator 105g multiplies the reference distance [V] obtained in the preprocessing of the advance information on a meeting by the value of a weight [W] held in the storage 105b. Here, the value of the weight [W] by which the reference distance [V] is multiplied is selected from the weights [W] held in the storage 105b, corresponding to the type of meeting set by the operation of the inputter 102 at the start of the processing. In other words, referring to FIG. 3, the weight [W]=2.0 is selected when the type of meeting indicates a meeting for "(2) problem resolution", and the weight [W]=5.0 is selected when the type of meeting indicates a meeting for "(3) brainstorming".

Furthermore, when setting a weight [W2] to an elapsed time of the meeting is specified as the setting for the start of the meeting by the operation of the inputter 102, the evaluator 105g performs weighting processing on the weight [W] corresponding to the type of meeting, in consideration of the weight [W2] set in the n-th time slot. In this case, for example, processing ([V]×[W]×[W2]) is performed in which the reference distance [V] is multiplied by the values of the weight [W] and weight [W2].

Likewise, when setting a weight to each participant is specified as the setting for the start of the meeting by the operation of the inputter 102, the evaluator 105g performs processing on the weight [W], corresponding to the type of meeting, also in consideration of weighting each participant.

When there is a topic, the processing described above is similarly performed also on the topic as well.

[Step S108]

In step S108, the evaluator 105g compares the value ([V]×[W] or [V]×[W]×[W2]) that is obtained by weighting the reference distance [V] obtained in the processing of step S107, with the distance [Vn] (second feature value) from the subject [Tm] in the n-th time slot calculated in S106. Then, if the distance [Vn] from the subject [Tm] in the n-th time slot is determined to be larger than the weighted value ([V]×[W] or [V]×[W]×[W2]) (YES), the process proceeds to step S109, and otherwise, the process proceeds to step S110.

Note that when there is a topic, the processing described above is similarly performed also on the topic as well, and when it is determined that any of the subject [Tm] and the topic is determined to have the distance [Vn] that is larger than the weighted value ([V]×[W] or [V]×[W]×[W2]) (YES), the process proceeds to step S109.

[Step S109]

In step S109, the evaluator 105g causes the notifier 104 to notify that a meeting discussion is off topic from the subject [Tm]. Therefore, in a case where the notifier 104 has a display unit, an alert is displayed that a meeting discussion is off topic from the subject [Tm], and in a case where the notifier 104 has a speaker, an alert sound is emitted.

[Step S110]

In step S110, the evaluator 105g determines whether the meeting has ended. At this time, for example, when the end of the meeting is input from the inputter 102, the evaluator 105g determines that the meeting has ended (YES), and otherwise, the evaluator 105g determines that the meeting does not end (NO). If it is determined that the meeting has ended (YES), the process ends. On the other hand, if it is determined that the meeting does not end (NO), the process proceeds to step S111.

Note that, in step S110, if a discussion is made on a plurality of subjects in a meeting, it is determined whether a discussion on one subject has been finished. Then, when a discussion on the next subject is to be started, for example, the chairman [Pc] of the meeting inputs the setting for the start of the meeting on the next subject by operating the inputter 102. Thus, the processing from step S101 is started.

[Step S111]

In step S111, the evaluator 105g performs increment processing to increment the n-th time slot to [n=n+1] and returns to step S103 to repeat the processing for the next n-th time slot.

EFFECTS OF EMBODIMENTS

According to an embodiment described above, a relationship between words (words or phrases) extracted from the speech information in the ongoing meeting is quantified and compared with an allowable range obtained by weighting according to the type of meeting, and thus the progress of the meeting is determined. This makes it possible to set the range of off-topic discussion from a subject of a meeting, for each type of meeting, and determine the progress of the meeting, and thus, the meeting is more accurately prevented from being off topic from a predetermined subject.

This makes it possible to prevent hindrance of the progress of a meeting by making it difficult to issue an alert, in a meeting for brainstorming in which off-topic discussion from the subject is permitted to some extent. On the other hand, in a meeting for briefing in which off-topic discussion from the subject is unlikely to be permitted, it is possible to lead a discussion on the subject by making it easy to issue an alert.

Note that in the above embodiments, the procedure for determining the progress of the meeting from the text information of the meeting by using the co-occurrence network has been described. However, in the present invention, the analysis method for quantifying a relationship between words is not limited to the method using the co-occurrence network. Furthermore, processing of the voice information of the advance information on the meeting and speech information in the ongoing meeting is not limited to conversion into text but may be conversion into vector information.

Although embodiments of the present invention have been described and illustrated in detail, the disclosed embodiments are made for purposes of illustration and example only and not limitation. The scope of the present invention should be interpreted by terms of the appended claims

What is claimed is:

1. A meeting support system that supports the progress of a meeting, the meeting support system comprising
   a hardware processor that:
   determines a first feature value based on information about a meeting, the first feature value corresponding to a range of a subject of a meeting, the information about a meeting having been registered in advance;
   stores a weight, the weight corresponding to each type of meeting;
   extracts a word or phrase from speech of participants in a meeting;
   determines a second feature value corresponding to the extracted word or phrase; and
   determines whether a speech is off topic from a subject of a meeting, depending on whether the second feature value is included in an allowable range, the allowable range being specified by the first feature value and the weight corresponding to a type of an ongoing meeting.

2. The meeting support system according to claim 1, wherein
   the hardware processor, at a predetermined time interval after the ongoing meeting starts,
   calculates the second feature value based on the speech of the participants in the meeting, the speech being acquired in a predetermined time slot in the progress of the ongoing meeting, and
   performs the determination each time the second feature value is determined.

3. The meeting support system according to claim 1, wherein
   the hardware processor determines, as the first feature value and the second feature value, an average of distances from words or phrases to a subjective word or phrase, the words or phrases being obtained by morphological analysis of text information, the subjective word or phrase being specified from the words or phrases.

4. The meeting support system according to claim 3, wherein
   the hardware processor extracts, as the subjective word or phrase, a central word or phrase in a network by performing network analysis of the text information.

5. The meeting support system according to claim 3, wherein
   the hardware processor extracts a topic from among words or phrases highly relevant to the subject by the network analysis and also determines, as the first feature value, an average of distances from words or phrases to a word or phrase serving as the topic.

6. The meeting support system according to claim 1, wherein
   the second feature value indicates a distance from the extracted word or phrase to the subject.

7. The meeting support system according to claim 1, wherein
   the hardware processor extracts the word or phrase from text information obtained by converting voice acquired during the meeting into text.

8. The meeting support system according to claim 1, wherein
   the word or phrase is a word.

9. The meeting support system according to claim 1, wherein
   the hardware processor generates a first co-occurrence network with words or phrases included in text information as nodes and determines the first feature value based on a distance from a central word or phrase to another word or phrase in the co-occurrence network, the text information being registered in advance for the meeting, the first co-occurrence network indicating connection between words and phrases.

10. The meeting support system according to claim 1, wherein
the hardware processor generates a second co-occurrence network with the extracted words or phrases as nodes and determines, as the second feature value, a distance from a word or phrase to the subject in the second co-occurrence network, the second co-occurrence network indicating connection between words or phrases.

11. The meeting support system according to claim 1, further comprising
an inputter that specifies the subjective word or phrase.

12. The meeting support system according to claim 1, wherein
when a plurality of subjects is specified as the subject of the meeting, the hardware processor determines the second feature value for each of the plurality of subjects.

13. The meeting support system according to claim 12, wherein
when a plurality of subjects is specified for the ongoing meeting, the hardware processor determines whether the extracted words or phrases are categorized into which subject and determines the second feature value for each of the subjects into which the extracted words or phrases are categorized.

14. The meeting support system according to claim 1, wherein
when the second feature value obtained for the ongoing meeting exceeds the allowable range, the hardware processor determines that a discussion during the ongoing meeting is off topic from the subject of the meeting.

15. The meeting support system according to claim 1, further comprising
a notifier that provides notification of a determination result by the hardware processor.

16. The meeting support system according to claim 1, further comprising:
a voice acquisitor that acquires voice during a meeting, wherein
the hardware processor converts voice information into text information.

17. The meeting support system according to claim 1, wherein
the information having been registered in advance includes at least one of information acquired in a past meeting and materials related to the ongoing meeting, the past meeting being related to the ongoing meeting.

18. The meeting support system according to claim 1, wherein
the hardware processor holds a weight that changes the first feature value with an elapsed time of a meeting, as a value corresponding to the elapsed time of the meeting, and
processes the first feature value by using a weight corresponding to a type of the ongoing meeting and a weight corresponding to an elapsed time of the ongoing meeting to calculate the allowable range corresponding to the elapsed time in the ongoing meeting.

19. The meeting support system according to claim 1, wherein
the hardware processor holds information about a specific participant in the ongoing meeting, and
extracts the word or phrase from a speech of participants in the meeting excluding the specific participant.

20. The meeting support system according to claim 1, wherein
the types of meetings include a meeting for briefing, a meeting for problem resolution, a meeting for brainstorming, and a meeting for decision making.

21. A meeting support device comprising the meeting support system according to claim 1.

22. A non-transitory recording medium storing a computer readable meeting support program for supporting progress of a meeting, the program comprising:
extracting a word or phrase from speech of participants in a meeting;
determining a feature value corresponding to the extracted word or phrase; and
determining whether a speech is off topic from a subject of a meeting, depending on whether the feature value is included in an allowable range determined for each type of meeting.

* * * * *